(12) United States Patent
Mayell (10) Patent No.: US 8,279,636 B2
(45) Date of Patent: *Oct. 2, 2012

(54) FLYBACK CONVERTER WITH FORWARD CONVERTER RESET CLAMP

(75) Inventor: Robert J. Mayell, San Francisco, CA (US)

(73) Assignee: Power Integrations, Inc., San Jose, CA (US)

( * ) Notice: Subject to any disclaimer, the term of this patent is extended or adjusted under 35 U.S.C. 154(b) by 965 days.

This patent is subject to a terminal disclaimer.

(21) Appl. No.: 12/234,519

(22) Filed: Sep. 19, 2008

(65) Prior Publication Data
US 2010/0073968 A1   Mar. 25, 2010

(51) Int. Cl.
*H02M 3/335* (2006.01)
(52) U.S. Cl. ............ 363/21.12; 363/18; 363/20; 363/65
(58) Field of Classification Search .................... 363/16, 363/17, 18, 20, 21.01, 21.02, 21.04, 21.12, 363/65
See application file for complete search history.

(56) References Cited

U.S. PATENT DOCUMENTS

| | | | |
|---|---|---|---|
| 5,790,391 A | 8/1998 | Stich et al. | |
| 5,872,705 A * | 2/1999 | Loftus et al. | 363/21.06 |
| 5,991,171 A | 11/1999 | Cheng | |
| 6,108,217 A * | 8/2000 | Tran | 363/20 |
| 6,295,213 B1 * | 9/2001 | Smith | 363/21.01 |
| 6,496,390 B2 | 12/2002 | Yang | |
| 6,515,875 B2 * | 2/2003 | Yasumura | 363/21.02 |
| 6,639,814 B2 | 10/2003 | Gan et al. | |
| 6,908,164 B2 | 6/2005 | Gilbert et al. | |
| 6,987,675 B2 * | 1/2006 | Jovanovic et al. | 363/21.01 |
| 7,995,360 B2 | 8/2011 | Mayell | |
| 2009/0257254 A1 | 10/2009 | Leu | |

OTHER PUBLICATIONS

U.S. Appl. No. 13/171,807, filed Jun. 29, 2011, Mayell.

* cited by examiner

*Primary Examiner* — Nguyen Tran
(74) *Attorney, Agent, or Firm* — Blakely Sokoloff Taylor & Zafman LLP (57) ABSTRACT

A power supply includes a first power converter, a second power converter, and a clamp reset circuit. The clamp reset circuit is electrically coupled to other components within the first power converter and the second power converter. A clamp standby connection can be provided to electrically couple the clamp reset circuit to components comprising the second power converter. The clamp reset circuit is coupled to reduce magnetizing energy of a transformer of the first power converter and limit voltage in a component of the second power converter. The clamp reset circuit may include a Zener diode and a resistor that are adapted to reduce magnetizing energy of the first power converter and voltage through the second power converter. The clamp reset circuit normally includes a capacitor that is adapted to store energy from the first power converter and the second power converter.

35 Claims, 6 Drawing Sheets

FLYBACK CONVERTER WITH FORWARD CONVERTER RESET CLAMP

BACKGROUND OF THE INVENTION

1. Field of the Invention

The present invention relates generally to power supplies, and more specifically to power supplies typically utilized in electrical equipment such as a printer, or the like that uses a standby power and a main power supply.

2. Discussion of the Related Art

Particular types of power supplies may convert the alternating current (AC) line delivered from a wall socket to the direct current (DC) power usable with today's electronics. In some circumstances, power supplies generally utilize two separate power supplies within the power supply itself.

In one example, a personal computer (PC) may use a power supply which includes a main power supply and a standby power supply. Both the main and standby power supplies relay power to other components comprising a PC. The PC main supplies the main power, which supplies power to the motherboard and processor of a PC. In addition, the PC main is designed to provide a large amount of output power (which is typically between 200-400 watts) to supply the motherboard and additional components, such as disk drives and video cards. On the other hand, the standby power supply provides a lower amount of output power (which is typically less than 5 or 10 watts).

Unlike the main power supply, which powers down when a user has indicated shut down of the PC (or other electronic device), the standby power supply normally does not shut down and (after being powered up) continues to convert an input voltage into an appropriate output voltage. Thus, the main power supply operates on an as-needed basis, while the standby power supply continues to operate whenever an input voltage is present (i.e. the power supply is plugged into a wall socket). The standby power supply then provides power to components which continue to run once the PC (or other electronic device) has been powered down in response to a user indication. For example, the standby power supply provides power to the power button of a computer so a user can use the power button to manually start the PC (which provides an indication to power up or power down the main power converter). In another application, the main and standby power supply may be utilized with a printer. The standby power supply may provide power to the network connection of a printer such that the printer may monitor for any incoming print job requests while in a standby (or idle) mode and become active when a print job request is received.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As mentioned above, a power supply may utilize a main power supply and a standby power supply in operation. The main power supply is typically designed with a two-switch forward converter. The two-switch forward converter is often the lowest cost configuration that that is suited for power supplies for personal computers and similar applications. The two-switch forward converter also has the advantages of producing high output current at high efficiencies. Alternatively, the main power supply may also be designed with a single-switch forward converter. For both of these forward converter topologies, an additional reset circuit may be utilized to manage the magnetizing energy of the transformer used in either the two-switch or single-switch forward converter topology.

On the other hand, the standby power converter is typically designed with a flyback converter. The flyback converter typically provides low output currents at low component cost. In addition, the flyback converter may utilize an additional clamp circuit which prevents excess voltage from damaging components within the flyback converter. Typically, each converter topology used in the power supply utilizes its own reset circuit or clamp circuit.

In accordance with the teachings of the invention, the main power supply and the standby power supply may both utilize a clamp reset circuit. The clamp reset circuit provides substantially similar advantages as the reset circuit typically utilized with the main power supply and further provides similar advantages as the clamp circuit typically utilized with the standby power supply. The components of the clamp reset circuit may be found within the main power supply and the standby power supply may electrically couple to the clamp reset circuit. Alternatively, the clamp reset circuit may be found within standby power supply and the main power supply may electrically couple to the clamp reset circuit. In other examples, the clamp reset circuit is a separate entity to which both the main power supply and the standby power supply electrically couple. By allowing the main power supply and the standby power supply to utilize the same clamp reset circuit, the teachings of the present invention may utilize fewer components and may provide a lower cost system than standard main and standby power supply designs used in electrical equipment, such as PC power supplies, printers, or the like.

Figure 1:
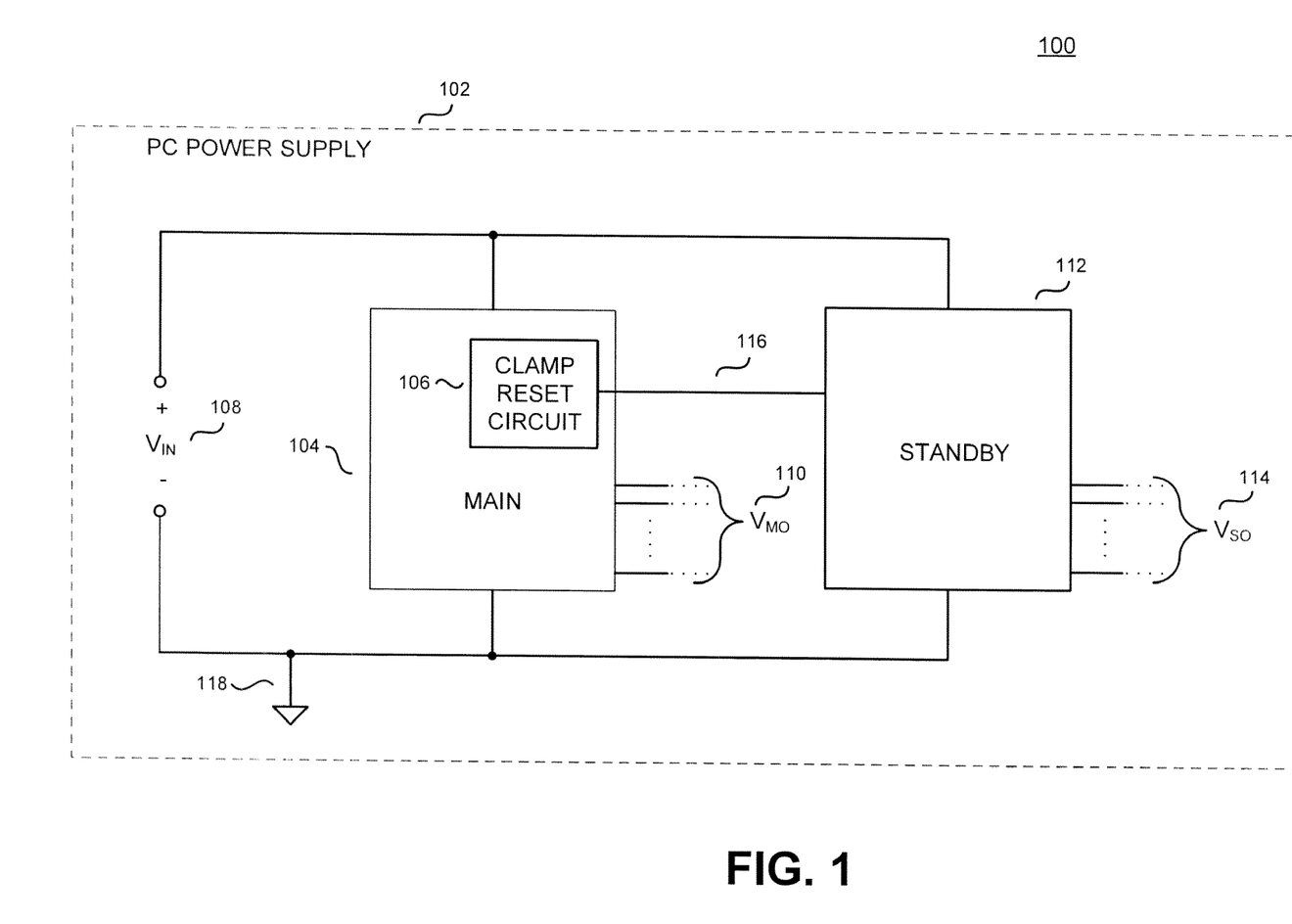
FIG. 1 illustrates a system block diagram of a power supply system in accordance with one embodiment of the present invention.

Referring first to FIG. 1, a system block diagram of a power supply system 100 in accordance with one embodiment of the present invention is illustrated including a power supply 102, a main power supply 104, a clamp reset circuit 106, an input ($V_{IN}$) 108, a main output ($V_{MO}$) 110, a standby power supply 112, a standby output ($V_{SO}$) 114, a clamp standby connection 116, and an input return 118.

The power supply 102 includes a main power supply 104. The main power supply 104 further includes a clamp reset circuit 106, which is electrically coupled to other components within the main power supply 104, and main output ($V_{MO}$) 110. The main power supply 104 is electrically coupled to the input ($V_{IN}$) 108, the standby power supply 112, and the input return 118 such that the voltage across the main power supply 104 is substantially equivalent to the input ($V_{IN}$) 108. In addition, the standby power supply 112 is also electrically coupled to the input ($V_{IN}$) 108, standby output ($V_{SO}$) 114, and input return 118 such that the voltage across the standby power supply 112 is substantially equivalent to the input ($V_{IN}$) 108. Through the clamp standby connection 116, the clamp reset circuit 106 is electrically coupled to components comprising the standby power supply 112. The input ($V_{IN}$) 108, main power supply 104 and standby power supply 112 are coupled to input return 118. The input return 118 provides the point of lowest potential, or in other words the point of lowest voltage with respect to the input ($V_{IN}$) 108, for the power supply system 100.

Within the power supply 102, the main power supply 104 comprises circuitry to convert the received input ($V_{IN}$) 108 into an appropriate output (and in some embodiments, one or more output levels). In one embodiment, the input ($V_{IN}$) 108 may be a rectified AC voltage. In one example, the main power supply 104 utilizes a forward converter topology to convert the incoming power to the desired output level (further illustrated with respects to FIGS. 2 and 3). The main power supply 104 provides the output to one or more devices external from the power supply 102. However, the main power supply 104 can also provide appropriate output levels to devices which are internal to the power supply 102. It should be appreciated that the main power supply 104 may comprise one or more main outputs ($V_{MO}$) 110 which provide power to one or more devices. It should also be appreciated that the main output ($V_{MO}$) 110 may also output voltages, currents, or a combination of both. The main power supply 104 may provide a variety of different output levels along each main output ($V_{MO}$) 110. For example, the main power supply 104 may provide output voltages such as 3.3 Volts (V), 5 V, or ±12V. In addition, the main power supply further comprises circuitry of the clamp reset circuit 106. The use of the clamp reset circuit 106 allows the main power supply 104 to manage the magnetizing energy within the transformer of the main power supply 104. In other words, the clamp reset circuit 106 allows the main power supply 104 to operate at a larger range of input voltages.

The standby power supply 112 also comprises circuitry to convert the input ($V_{IN}$) 108, which comprises a rectified AC voltage in some embodiments, into an appropriate output level. In some examples, the standby power supply 112 utilizes a flyback converter topology to convert the incoming power to the desired output level (and in some embodiments, one or more output levels). The flyback converter topology is further illustrated with respect to FIG. 4. Output from the standby power supply 112 is provided to one or more devices external to the power supply 102. The standby power supply 112 can provide appropriate output levels to devices which are internal to the power supply 102. However, it should be appreciated that the standby power supply 112 may comprise one or more standby outputs ($V_{SO}$) 114. It should also be appreciated that the standby output ($V_{SO}$) 114 may also output voltages, currents, or a combination of both. The standby power supply 112 may provide a variety of different output levels along each standby output ($V_{SO}$) 114. For example, the standby power supply 112 may provide a variety of different voltage levels along each standby output ($V_{SO}$) 114 such as 3.3 Volts (V), 5 V, or ±12V. The clamp standby connection 116 electrically couples the standby power supply 112 to the clamp reset circuit 106. Use of the clamp reset circuit 106 with the standby power supply 112 prevents excessive voltage from damaging the electrical components (further illustrated with regards to FIG. 4) comprising the standby power supply 112.

It should be appreciated that in some examples of the present invention, the clamp reset circuit 106 may be found within the standby power supply 112 rather than the main power supply 104. However, the main power supply 112 may electrically couple to the clamp reset circuit 106. In other examples, the clamp reset circuit 106 is a separate entity to which both the main power supply 104 and the standby power supply 112 electrically couple. By allowing the main power converter 104 and the standby power supply 112 to utilize the same clamp reset circuit 106, the teachings of the present invention may utilize fewer components and may provide a lower cost system than standard main and standby power supply designs used in electrical equipment, such as PC power supplies, printers, or the like.

Figure 2:
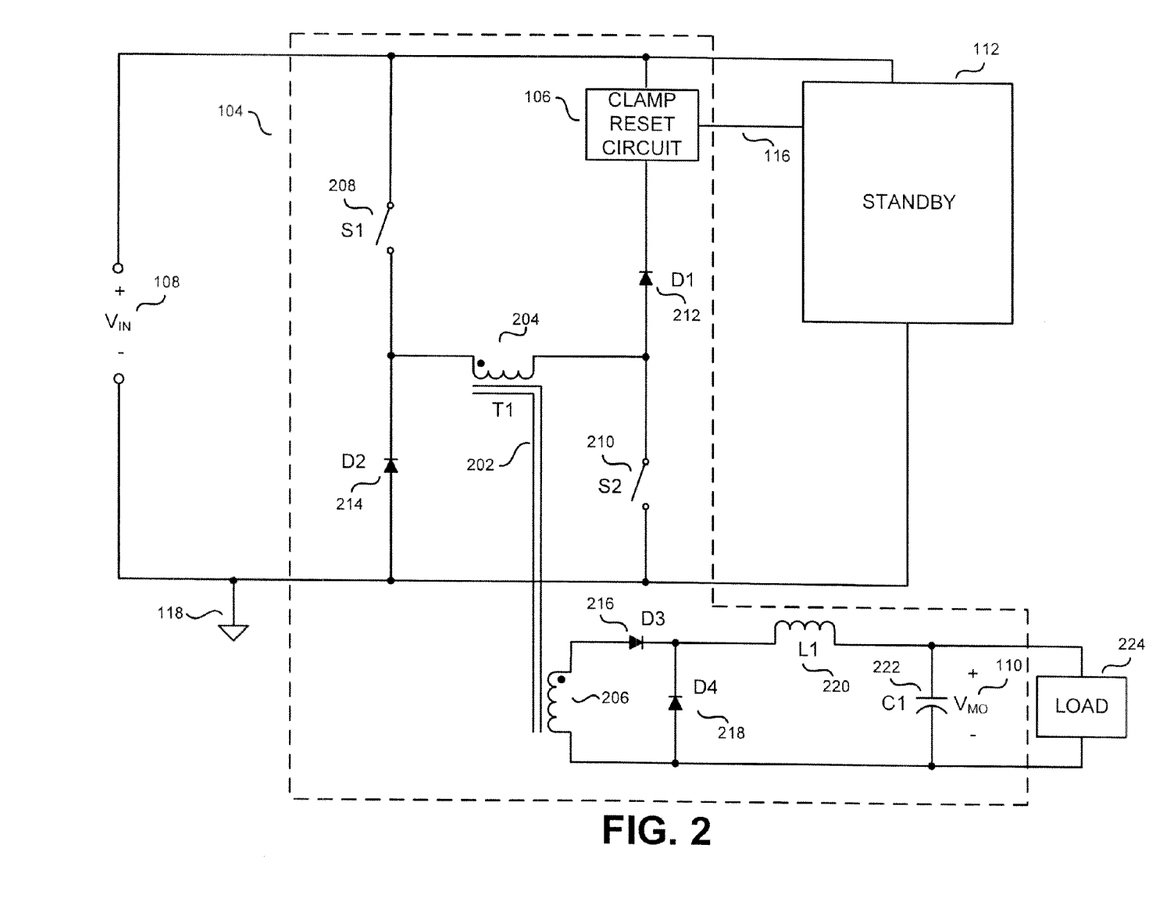
FIG. 2 illustrates a schematic diagram of a main power supply utilized with the power supply system of FIG. 1 in accordance with one embodiment of the present invention.

Referring next to FIG. 2, a schematic diagram is illustrated of a main power supply 104 utilized with the power supply system including clamp reset circuit 106, input ($V_{IN}$) 108, main output ($V_{MO}$) 110, standby power supply 112, clamp standby connection 116, input return 118, a transformer T1 202, a primary winding 204 of transformer T1 202, a secondary winding 206 of transformer T1 202, two active switches S1 208 and S2 210, two passive switches D1 212 and D2 214, an output diode D3 216, a freewheeling diode D4 218, an output inductor L1 220, an output capacitor C1 222, and a load 224.

The main power supply 104, clamp reset circuit 106, input ($V_{IN}$) 108, standby power supply 112, clamp standby connection 116, and input return 118 are electrically coupled as discussed with respect to FIG. 1. As mentioned above, the main power supply 104 may be designed with a two-switch forward converter topology. The two-switch forward converter is often the lowest cost configuration suited for power supplies for personal computers and similar applications.

An active switch normally receives a control signal which switches between states to control the opening and closing of the active switch, whereas a passive switch does not receive a control signal to switch between an open and closed state. An open switch normally does not conduct current. A closed switch can conduct current. Active switches typically have one or more control terminals that determine whether or not two other terminals of the active switch may conduct current. The control signals that open and close active switches S1 208 and S2 210 (as illustrated in FIG. 2 and in subsequent figures depicting active switches) are not shown to help avoid obscuring more important details of the invention.

Passive switches generally have only two terminals. Typically, the voltage between the terminals determines whether a passive switch is open or closed. A diode is sometimes considered a passive switch, because it generally conducts current when the voltage between its two terminals has one polarity (anode positive with respect to cathode), and substantially blocks current when the voltage between the terminals has the opposite polarity (anode negative with respect to cathode).

The main power supply 104 further comprises transformer T1 202, primary winding 204 of transformer T1 202, secondary winding 206 of transformer T1 202, two active switches S1 208 and S2 210, two passive switches D1 212 and D2 214, an output diode D3 216, a freewheeling diode D4 218, output inductor L1 220, and output capacitor C1 222 coupled together in a two-switch topology with reset capabilities illustrated herein. As shown, the active switch S1 208 and passive switch D1 212 are on the high-side of the two-switch forward converter since one of the ends of both the active switch S1 208 and the passive switch D1 212 is common with the positive terminal of the input ($V_{IN}$) 108 in a two-switch forward converter topology without the clamp reset circuit 106. On the other hand, the active switch S2 210 and the passive switch D2 214 are on the low-side of the two-switch forward converter since one of the ends of both the active switch S2 210 and the passive switch D2 214 is common with the input return 118. However, it should be appreciated that variants of the example power converter topology may be utilized with the teachings of the present invention. Clamp reset circuit 106 is coupled to high-side passive switch D1 212. The output is provided from the main power supply 104 through the main output ($V_{MO}$) 110, exemplified as the voltage across the output capacitor C1 222, and provided to a load 224 external from the power supply 102. The load 224 includes other electrical components receiving power from the power supply system 100, such as motherboards or hard disk drives. Although in some embodiments, the load 224 may be internal to the power supply 102.

The main power supply 104 utilizing the two-switch forward converter topology comprises two active switches, S1 208 and S2 210, with two passive switches, D1 212 and D2 214, and clamp reset circuit 106 in a configuration that produces a voltage on a primary winding 204 of a transformer T1 202 from an input ($V_{IN}$) 108. A secondary winding 206 of the transformer T1 202 produces a voltage proportional to the voltage on a primary winding 204 of a transformer T1 202. An output diode 216 rectifies the voltage at the secondary winding 206. A freewheeling diode D4 218 provides a path for current in the output inductor L1 when the output diode D3 216 is reverse biased. An output inductor L1 220, and an output capacitor C1 222 filter the rectified voltage from the secondary winding 206 to produce a main output ($V_{MO}$) 110 at the load 224. As shown, primary winding 204 is galvanically isolated from secondary winding 206. In particular, galvanic isolation prevents DC current from the primary side circuitry (circuitry electrically coupled to the primary winding 204) from being received by secondary circuitry (circuitry electrically coupled to the secondary winding 206). However, it should be appreciated that the primary winding 204 need not be galvanically isolated from the secondary winding 206.

As illustrated, the main power supply 104 utilizes the clamp reset circuit 106 along with the two-switch forward converter topology. The clamp reset circuit 106 manages the magnetizing energy of the transformer T1 202 of the main power supply 104. The two-switch forward converter configuration allows the magnetic energy of the transformer T1 to reset (that is, return to a much lower value) when the active switches S1 208 and S2 210 are off. Resetting (or in other words reducing) the magnetizing energy of the transformer T1 prevents excess stored energy from saturation the transformer T1 and thereby altering its properties. The reset is generally achieved by applying a reset voltage of appropriate magnitude and duration to the primary winding 204 when the active switches S1 208 and S2 210 are off. It is often desirable to set the reset voltage to a higher value than the voltage which appears on the primary winding 204 when the active switches S1 208 and S2 210 are on. The clamp reset circuit 106 develops a substantially constant voltage which is applied to the primary winding during the reset time of the transformer T1. In the two-switch forward converter, the reset voltage is a sum of the input voltage ($V_{IN}$) 108 and the voltage on the clamp reset circuit 106. For the main power supply 104, the clamp reset circuit 106 increases the voltage on the primary winding 204 of the transformer T1 202 when the passive switches, D1 212 and D2 214, are conducting current and the active switches S1 208 and S2 210 are open. As mentioned above, the clamp reset circuit 106 is also electrically coupled to the standby power supply 112 through clamp standby connection 116 and is utilized to prevent excessive voltage from damaging the components comprising the standby power supply 112 (or in other words, "clamp" the voltage within acceptable tolerance levels).

Generally, the main power supply 104 and the standby power supply 112 within a power supply are two separate power supplies sharing the same input. The main power supply 104 and the standby power supply 112 share the clamp reset circuit 106, in accordance with the teachings of the present invention, and the configuration of the main power supply 104 and the standby power supply 112 discussed may provide lower cost benefits.

Figure 3:
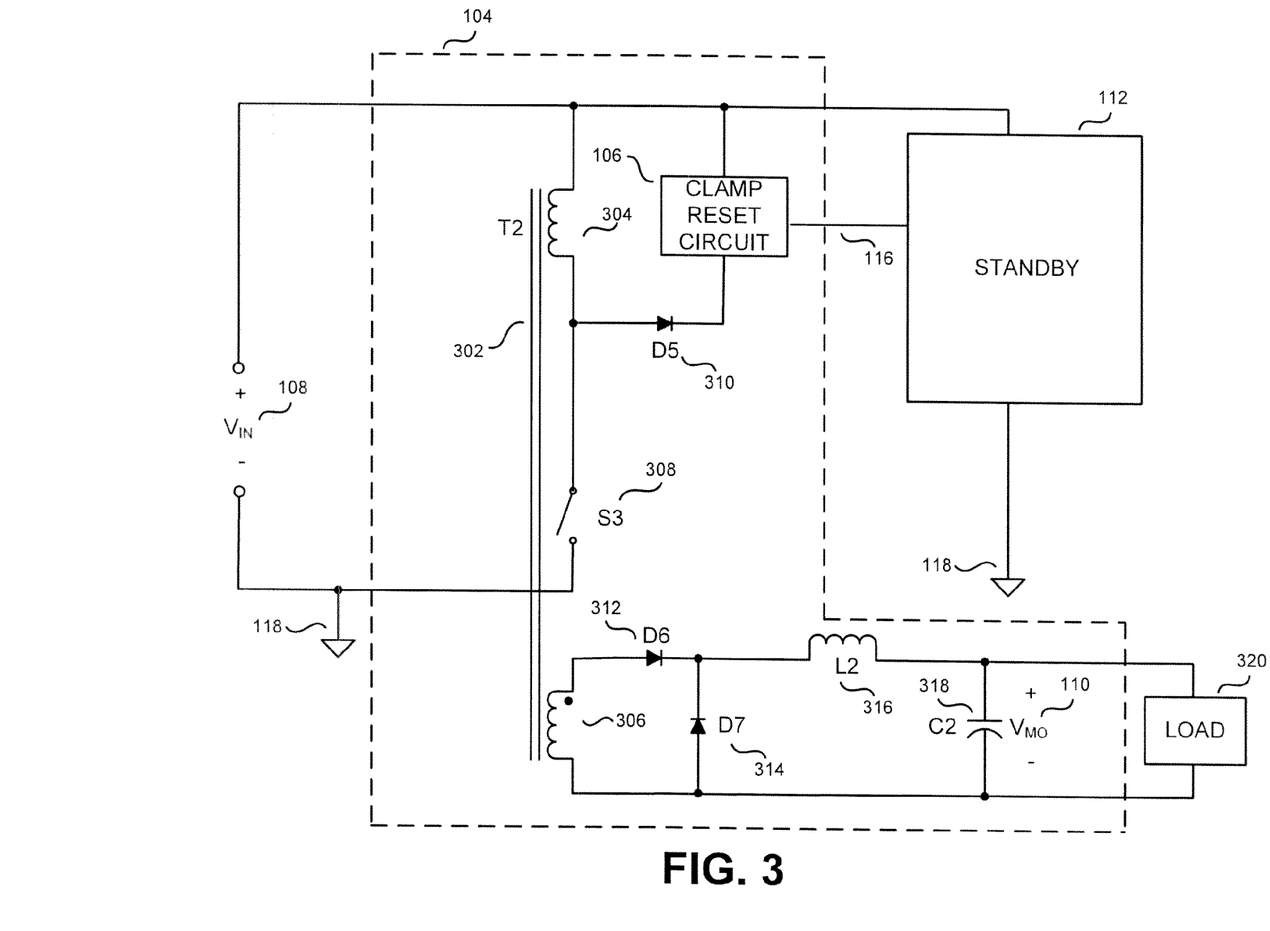
FIG. 3 illustrates another schematic diagram of a main power supply utilized with the power supply system of FIG. 1 in accordance with another embodiment of the present invention.

Referring to FIG. 3, another schematic diagram of a main power supply 104 utilized with the power supply system 100 is illustrated including clamp reset circuit 106, input ($V_{IN}$) 108, main output ($V_{MO}$) 110, standby power supply 112, clamp standby connection 116, input return 118, a transformer T2 302, a primary winding 304 of transformer T2 302, a secondary winding 306 of transformer T2 302, an active switch S3 308, a passive switch D5 310, an output diode D6 312, a freewheeling diode D7 314, an output inductor L2 316, an output capacitor C2 318, and a load 320.

The main power supply 104, clamp reset circuit 106, input ($V_{IN}$) 108, standby power supply 112, clamp standby connection 116, and input return 118 are electrically coupled as discussed above. Unlike the main power supply 104 illustrated in FIG. 2, the main power supply 104 illustrated in FIG. 3 utilizes a single-switch forward converter topology. The main power supply comprises transformer T2 302, primary winding 304 of transformer T2 302, secondary winding 306 of transformer T2 302, active switch S3 308, passive switch D5 310, an output diode D6 312, a freewheeling diode D7 314, output inductor L2 316, output capacitor C2 318, and load 320 coupled together in a single-switch topology with reset capabilities illustrated herein. As shown, primary winding 304 is galvanically isolated from secondary winding 306. In particular, galvanic isolation prevents DC current from the primary side circuitry (circuitry electrically coupled to the primary winding 304) from being received by secondary circuitry (circuitry electrically coupled to the secondary winding 306). However, it should be appreciated that the primary winding 304 need not be galvanically isolated from the secondary winding 306. Clamp reset circuit 106 is coupled to the cathode of the passive switch D5 310. The output is provided from the main power supply 104 through the main output ($V_{MO}$) 110, exemplified as the voltage across the output capacitor C2 318, and provided to the load 320 external from the power supply 102. Although in some embodiments, the load 320 may be internal to the power supply 102.

The main power supply 104 utilizing the single-switch forward converter topology comprises active switch S3 308 with passive switch D5 310 and clamp reset circuit 106 in a configuration that produces a voltage on a primary winding 304 of a transformer T2 302 from an input ($V_{IN}$) 108. A secondary winding 306 of the transformer T2 302 produces a voltage proportional to the voltage on a primary winding 304 of a transformer T2 302. An output diode D6 312 rectifies the voltage at the secondary winding 306. A freewheeling diode D7 314 provides a path for current in the output inductor L2 316 when the output diode D6 312 is reverse biased. An output inductor L2 316 and an output capacitor C2 318 filter the rectified voltage from the secondary winding 306 to produce a main output ($V_{MO}$) 110 at the load 320. The clamp reset circuit 106 manages the magnetizing energy of the transformer T2 302 of the main power supply 104. The single-switch forward configuration allows the magnetizing energy of the transformer T2 to reset (that is, return to a much lower value) when the active switch S3 308 is off. Resetting (or in other words reducing) the magnetizing energy of the transformer T2 prevents excess stored energy from saturation the transformer T2 and thereby altering its properties. The reset is generally achieved by applying a reset voltage of appropriate magnitude and duration to the primary winding 304 when the active switch S3 308 is off. It is often desirable to set the reset voltage to a higher value than the voltage which appears on the primary winding 304 when the active switches S3 is on. The clamp reset circuit 106 develops a substantially constant voltage which is applied to the primary winding during the reset time of the transformer T2. In the single-switch forward converter, the reset voltage is the voltage on the clamp reset circuit 106. For the main power supply 104, the clamp reset circuit 106 sets the voltage on the primary winding 304 of the transformer T2 302 when the passive switch D5 310 is conducting current. As mentioned above, the standby power supply 112 is coupled to the clamp reset circuit 106 through clamp standby connection 116. The main power supply 104 and the standby power supply 112 share the clamp reset circuit 106, in accordance with the teachings of the present invention, and the configuration of the main power supply 104 and the standby power supply 112 discussed may provide lower cost benefits.

Figure 4:
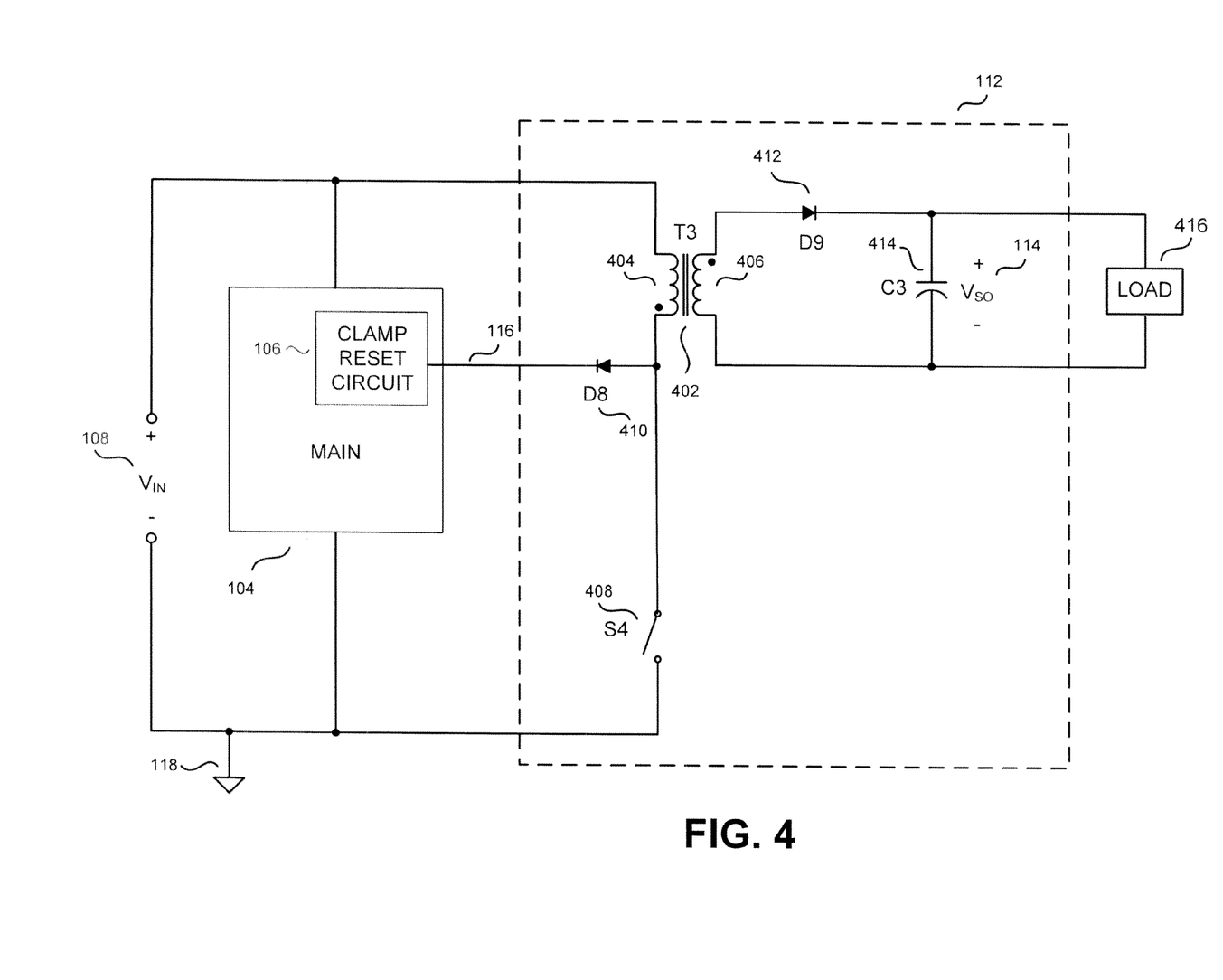
FIG. 4 illustrates a schematic diagram of a standby power supply utilized with the power supply system of FIG. 1 in accordance with one embodiment of the present invention.

FIG. 4 illustrates a schematic diagram of a standby power supply 112 utilized with the power supply system 100 comprising main power supply 104, clamp reset circuit 106, input ($V_{IN}$) 108, standby power supply 112, standby output ($V_{SO}$) 114, clamp standby connection 116, input return 118, a coupled inductor T3 402, a primary winding 404 of the coupled inductor T3 402, a secondary winding 406 of the coupled inductor T3 406, an active switch S4 408, a passive switch D8 410, a rectifier D9 412, an output capacitor C3, and a load 416.

The main power supply 104, clamp reset circuit 106, input ($V_{IN}$) 108, standby power supply 112, clamp standby connection 116, and input return 118 are electrically coupled as discussed with respect to FIG. 1. As mentioned above, the standby power supply 112 is typically designed with a flyback converter topology utilizing a reset circuit. The flyback converter topology often provides a low cost solution suited for a standby power supply. The standby power supply 112 further comprises coupled inductor T3 402, primary windings 404 of the coupled inductor T3 402, secondary windings 406 of the coupled inductor T3 406, active switch S4 408, passive switch D8 410, rectifier D9 412, output capacitor C3, and load 416 coupled together in a flyback converter topology with clamp capabilities illustrated herein. Clamp reset circuit 106 is coupled to the cathode of the passive switch D8 410. In addition, the clamp reset circuit 106 couples to the standby power supply 112 through clamp standby connection 116. The output is provided from the standby power converter 112 through the standby output ($V_{SO}$) 114, exemplified as the voltage across the output capacitor C3 414, and provided to a load 416 external from the power supply 102. Although in some embodiments, the load 416 may be internal to the power supply 102.

The standby power supply 112 utilizing the flyback converter topology comprises active switch S4 408 with passive switch D8 410 and clamp reset circuit 106 in a configuration which produces a voltage on the primary winding 404 of the coupled inductor T3 402 from an input ($V_{IN}$) 108. A secondary winding 406 of the coupled inductor T3 402 produces a voltage proportional to the voltage on the primary winding 404 of the coupled inductor T3 402. The output diode D9 412 rectifies the voltage at the secondary winding 406, and an output capacitor C3 filters the current from the output diode D9 412 to produce the standby output ($V_{SO}$) 114 at the load 416. As shown, primary winding 404 is galvanically isolated from secondary winding 406. In particular, galvanic isolation prevents DC current from the primary side circuitry (circuitry electrically coupled to the primary winding 404) from being received by secondary circuitry (circuitry electrically coupled to the secondary winding 406). However, it should be appreciated that the primary winding 404 need not be galvanically isolated from the secondary winding 406. As mentioned above, the standby power supply 112 is further coupled to the clamp reset circuit 106 through the clamp standby connection 116. The clamp reset circuit 106 limits the maximum voltage on the active switch S4 408 when the passive switch D8 is conducting current. The main power supply 104 and the standby power supply 112 share the clamp reset circuit 106, in accordance with the teachings of the present invention, and the configuration discussed may provide lower cost benefits.

Figure 5:
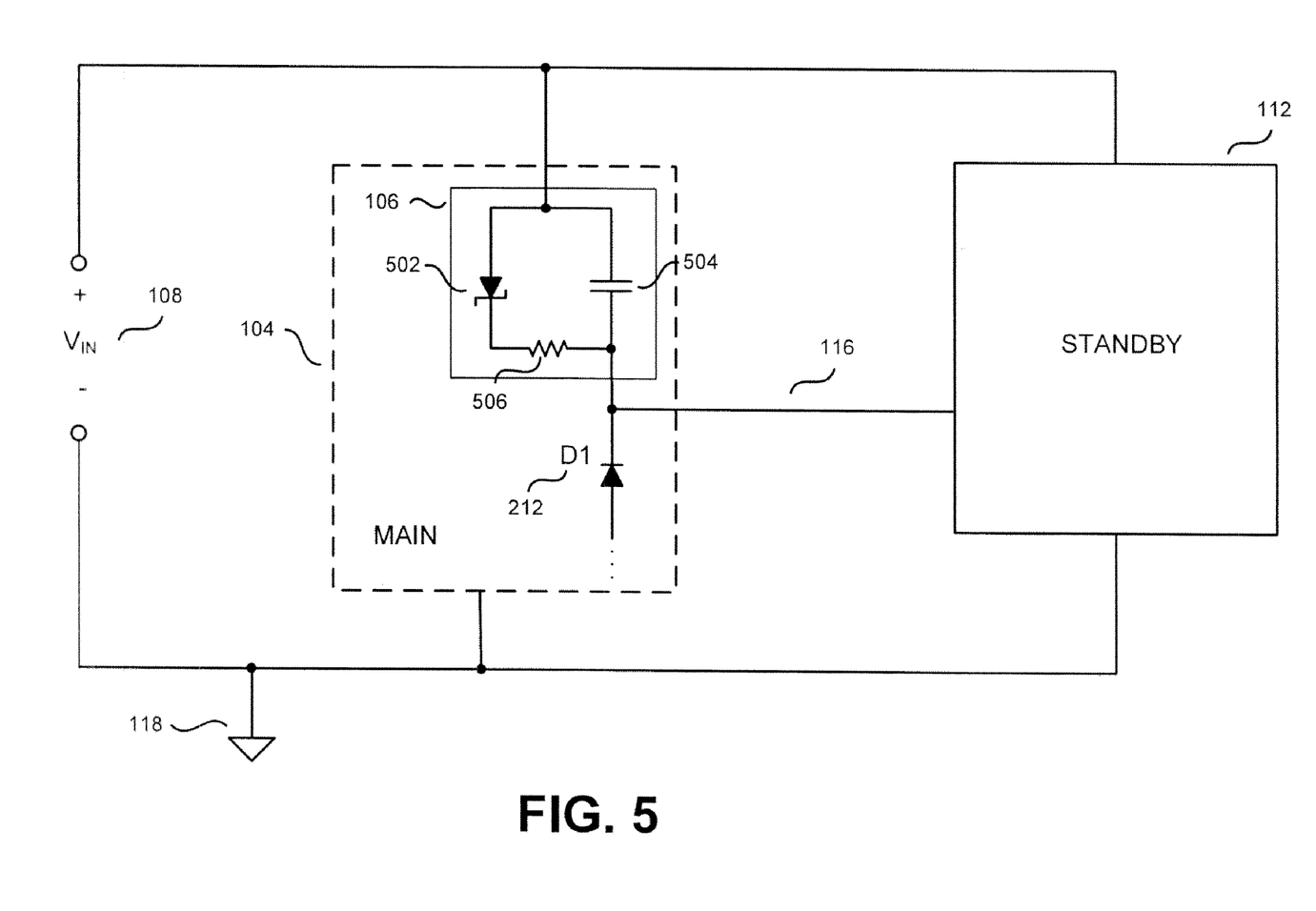
FIG. 5 illustrates a schematic diagram of a clamp reset circuit utilized with the power supply system of FIG. 1 in accordance with one embodiment of the present invention.

FIG. 5 illustrates one example of a schematic diagram of the clamp reset circuit 106 utilized with the power supply system 100 comprising main power supply 104, clamp reset circuit 106, input ($V_{IN}$) 108, standby power supply 112, clamp standby connection 116, input return 118, a Zener diode 502, a capacitor 504, and a resistor 506.

The main power supply 104, clamp reset circuit 106, input ($V_{IN}$) 108, standby power supply 112, clamp standby connection 116, and input return 118 are electrically coupled as discussed with respect to the previous figures. The Zener diode 502 is electrically coupled to the resistor 506; the Zener diode 502 and the resistor 506 are then electrically coupled to the capacitor 504. The clamp reset circuit 106 is coupled to the standby power supply 112 through the clamp standby connection 116. The standby power supply 112 electrically couples to the clamp reset circuit 106 at a point between the passive switch D1 212, when (for example) the configuration illustrated in FIG. 2 is utilized. In another embodiment, the standby power supply 112 electrically couples to the clamp reset circuit 106 at passive switch D5 as illustrated in FIG. 3. In other words, the standby power supply 112 electrically couples to the clamp reset circuit 106 at a point between the clamp reset circuit 106 and the input return 118. However, it should be appreciated that the main power supply 104 and the standby power supply 112 can be coupled to the clamp reset circuit using any number of configurations depending on the circuit topology utilized for the main and standby power supply 104 and 112.

For the main power supply 104, the clamp reset circuit 106 manages the magnetizing energy of the transformer within the main power supply 104. Both the single switch configuration and the two switch configuration allow the magnetizing energy of the transformer to reset (that is, return to a much lower value) when the active switches are off. Resetting the magnetizing energy of the transformer prevents excess stored energy from saturating the transformer and thereby altering its properties. The reset is generally achieved by applying a reset voltage of appropriate magnitude and duration to the primary winding when the active switches are off. When a two-switch forward converter is used, the clamp reset circuit 106 allows the voltage of the primary winding utilized by the main power supply 104 to increase when the passive switches are conducting current. On the other hand, the clamp reset circuit 106 prevents excess voltage from damaging components to occur in the standby power supply 112. In other words, the clamp reset circuit 106 limits the voltage across the active switch of the standby power supply 112 with a capacitor 504 which maintains a substantially constant voltage limited by the Zener diode 502. In general, the Zener diode 502 limits the voltage across the capacitor 504. The Zener diode 502 limits the energy received by the capacitor 504 from exceeding a threshold. The threshold typically corresponds to properties of the Zener diode 502, such as the Zener breakdown voltage.

In choosing the properties of the Zener diode 502, capacitor 504 and resistor 506, both the requirements of the main power supply 104 and the standby power supply 112 should be taken into account. Unlike the main power supply 104, the standby power supply 112 is constantly operating. As a result, the capacitor 504 within the clamp reset circuit may remain charged regardless of whether the main power supply 104 is operating. With the capacitor 504 charged, the main power supply 104 can bring the main output ($V_{MO}$) 110 into regulation faster than if the capacitor 504 was not charged.

Figure 6:
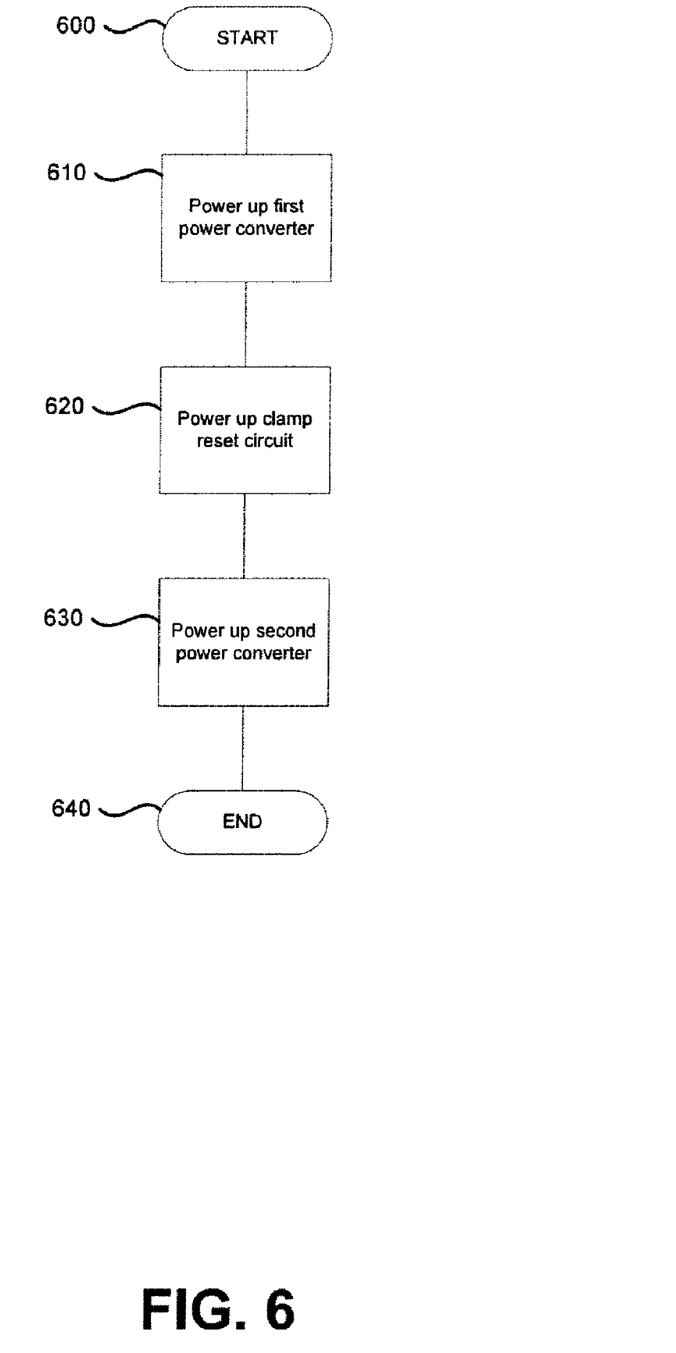
FIG. 6 is a flow diagram that illustrates a method for coupling a clamp reset circuit to a first and second power converter in a power supply.

FIG. 6 is a flow diagram that illustrates a method for coupling a clamp reset circuit to a first and second power converter in a power supply. After starting in block 600, the first power converter is powered up in block 610. The first power converter can be, for example, a main power converter of a power supply. The main power converter of a power supply can be used to supply full operational power at a variety of voltages for use in a computing system, for example.

In block 620, the clamp reset circuit is powered up. The clamp reset circuit is coupled to the first power converter and is adapted to reduce magnetizing energy of the first power converter (during reset, for example). The clamp reset circuit may include a Zener diode, a resistor, and a capacitor that is adapted to store energy from the first power converter.

In block 630, the second power converter is powered up. The second power converter can be, for example, a standby power converter of a power supply. The standby power converter of a power supply can be used to supply a relatively small amount of power at a variety of voltages for use in a computing system (e.g., for maintaining a desired minimum of functionality of the computing system) when the main power converter is powered down.

The second power converter is also coupled to the clamp reset circuit. Circuitry of the clamp reset circuit is adapted to reduce magnetizing energy of the second power converter (during reset, for example). The method ends in block 640.

While the invention herein disclosed has been described by means of specific embodiments, examples and applications thereof, numerous modifications and variations could be made thereto by those skilled in the art without departing from the scope of the invention set forth in the claims.

What is claimed is:

1. A power supply comprising:
    a first power converter adapted to convert an input to a first output;
    a clamp reset circuit coupled to a first primary winding of a first transformer included in the first power converter, wherein the clamp reset circuit is adapted to reduce magnetizing energy in the first transformer of the first power converter, wherein the clamp reset circuit further comprises:
        a capacitor, wherein the capacitor is adapted to store energy received from the first power converter and the second power converter; and
        a Zener diode coupled to the capacitor, wherein the Zener diode is adapted to prevent the energy received from the first power converter and the second power converter to exceed a threshold, wherein the Zener diode limits voltage on the capacitor; and
    a second power converter coupled to the clamp reset circuit and adapted to convert the input to a second output, wherein the clamp reset circuit is further coupled to a second primary winding of a second transformer included in the second power converter and adapted to limit voltage on a component of the second power converter.

2. The power supply of claim 1, wherein the second power converter is arranged to remain powered up while the first power converter is powered down.

3. The power supply of claim 1, wherein the first output is at least one of a first output voltage, a first output current, or both.

4. The power supply of claim 1, wherein the second output is at least one of a second output voltage, a second output current, or both.

5. The power supply of claim 1, wherein the first power converter further comprises circuitry in a two-switch forward converter topology.

6. The power supply of claim 5, wherein the two-switch forward converter topology further comprises a passive switch, wherein a first end of the passive switch is coupled to the clamp reset circuit.

7. The power supply of claim 1, wherein the first power converter further comprises circuitry in a single-switch forward converter topology.

8. The power supply of claim 7, wherein the single-switch forward converter topology further comprises a passive switch, wherein a first end of the passive switch is coupled to the clamp reset circuit.

9. The power supply of claim 1, wherein the second power converter further comprises circuitry in a flyback converter topology.

10. The power supply of claim 9, wherein the flyback converter topology further comprises a passive switch, wherein a first end of the passive switch is coupled to the clamp reset circuit.

11. The power supply of claim 1, wherein components of the clamp reset circuit are included in the first power converter.

12. The power supply of claim 1, wherein components of the clamp reset circuit are included in the second power converter.

13. A method for managing magnetic flux in a power supply comprising:
    powering up a first power converter adapted to convert an input to a first output;
    powering up a clamp reset circuit that is adapted to reduce magnetizing energy in a transformer of the first power converter, wherein the clamp reset circuit comprises:
        a capacitor coupled to store energy received from the first power converter and the second power converter; and
        a Zener diode coupled to prevent the energy received from the first power converter and the second power converter to exceed a threshold, wherein the Zener diode limits voltage on the capacitor; and
    powering up a second power converter adapted to convert the input to a second output, wherein the clamp reset circuit is further adapted to limit voltage on a component of the second power converter.

14. The method of claim 13, wherein the second power converter is arranged to remain powered up while the first power converter is powered down.

15. The method of claim 13, wherein the second power converter remains powered up while the first power converter is powered down in response to the user indication.

16. The method of claim 13, wherein the first output is at least one of a first output voltage, a first output current, or both.

17. The method of claim 16, wherein the second output is at least one of a second output voltage, a second output current, or both.

18. The method of claim 13, wherein the first power converter is arranged in a two-switch forward converter topology.

19. The method of claim 18, further comprising coupling a first end of a passive switch of the two-switch forward converter topology to the clamp reset circuit.

20. The method of claim 13, wherein the first power converter is arranged in a single-switch forward converter topology.

21. The method of claim 20, further comprising coupling a first end of a passive switch of the single-switch forward converter topology to the clamp reset circuit.

22. The method of claim 13, wherein the second power converter is arranged in a flyback converter topology.

23. The method of claim 22, further comprising coupling a first end of a passive switch of the flyback converter topology to the clamp reset circuit.

24. The method of claim 13, wherein components of the clamp reset circuit are included in the first power converter.

25. The method of claim 13, wherein components of the clamp reset circuit are included in the second power converter.

26. The power supply of claim 1, wherein the second power converter further comprises circuitry in a two-switch forward converter topology.

27. The power supply of claim 26, wherein the two-switch forward converter topology further comprises a passive switch, wherein a first end of the passive switch is coupled to the clamp reset circuit.

28. The power supply of claim 1, wherein the second power converter further comprises circuitry in a single-switch forward converter topology.

29. The power supply of claim 28, wherein the single-switch forward converter topology further comprises a passive switch, wherein a first end of the passive switch is coupled to the clamp reset circuit.

30. The power supply of claim 1, wherein the clamp reset circuit is coupled to a first terminal of the input which has a positive polarity with respect to a second terminal of the input.

31. The method of claim 13, wherein the second power converter is arranged in a two-switch forward converter topology.

32. The method of claim 31, further comprising coupling a first end of a passive switch of the two-switch forward converter topology to the clamp reset circuit.

33. The method of claim 13, wherein the second power converter is arranged in a single-switch forward converter topology.

34. The method of claim 33, further comprising coupling a first end of a passive switch of the single-switch forward converter topology to the clamp reset circuit.

35. The method of claim 13, further comprising coupling the clamp reset circuit to a first terminal of the input which has a positive polarity with respect to a second terminal of the input.

* * * * *